US012492113B2

(12) United States Patent
Hernandez

(10) Patent No.: US 12,492,113 B2
(45) Date of Patent: Dec. 9, 2025

(54) METHODS AND APPARATUS FOR BEVERAGE DISPENSING

(71) Applicant: Lancer Corporation, San Antonio, TX (US)

(72) Inventor: George E Hernandez, Selma, TX (US)

(73) Assignee: Lancer Corporation, San Antonio, TX (US)

( * ) Notice: Subject to any disclaimer, the term of this patent is extended or adjusted under 35 U.S.C. 154(b) by 176 days.

(21) Appl. No.: 18/376,078

(22) Filed: Oct. 3, 2023

(65) Prior Publication Data

US 2024/0109763 A1 Apr. 4, 2024

Related U.S. Application Data

(60) Provisional application No. 63/412,989, filed on Oct. 4, 2022.

(51) Int. Cl.
*B67D 1/00* (2006.01)
*B67D 1/14* (2006.01)

(52) U.S. Cl.
CPC ............... *B67D 1/005* (2013.01); *B67D 1/14* (2013.01); *B67D 2001/0093* (2013.01)

(58) Field of Classification Search
CPC .. B67D 1/005; B67D 1/14; B67D 2001/0093; B67D 1/1256; B67D 1/1277
See application file for complete search history.

(56) References Cited

U.S. PATENT DOCUMENTS

| | | | | |
|---|---|---|---|---|
| 5,415,326 | A | 5/1995 | Durham et al. | |
| 6,047,859 | A | 4/2000 | Schroeder et al. | |
| 6,098,842 | A | 8/2000 | Schroeder et al. | |
| 6,321,938 | B1 | 11/2001 | Edwards et al. | |
| 6,345,729 | B1 | 2/2002 | Santy, Jr. | |
| 6,983,863 | B2 | 1/2006 | Santy, Jr. | |
| 7,383,966 | B2 * | 6/2008 | Ziesel | B67D 1/0051 222/1 |
| 7,578,415 | B2 * | 8/2009 | Ziesel | B67D 1/0085 222/129.1 |
| 7,866,509 | B2 | 1/2011 | Ziesel | |
| 10,604,398 | B2 | 3/2020 | Smeller et al. | |
| 11,214,473 | B2 | 1/2022 | Roberts et al. | |
| 2009/0230149 | A1 | 9/2009 | Smeller et al. | |
| 2015/0315006 | A1 | 11/2015 | Ziesel | |
| 2018/0311625 | A1 * | 11/2018 | Valavala | B01F 23/43 |
| 2019/0330044 | A1 | 10/2019 | Conover et al. | |
| 2021/0252534 | A1 | 8/2021 | Eboigbodin et al. | |

OTHER PUBLICATIONS

PCT/US2023/034338. International Search Report, Written Opinion of the ISA, and the examiner's search strategy and results.
Lancer Corporation, Maintenance Manual for the Volumetric Post-Mix Valve, Jun. 1, 2004, pp. 1 and 10, issued by Lancer Corporation (see diffuser on p. 10).

* cited by examiner

*Primary Examiner* — Vishal Pancholi
(74) *Attorney, Agent, or Firm* — Christopher L. Makay

(57) ABSTRACT

A nozzle (10) and associated methods are provided in which a base fluid flows by a check valve (22) and is directed by a plurality of flow directors (42) into a diluent flow path. The check valve (22) closes the flow of base fluid when the base fluid is no longer demanded.

19 Claims, 9 Drawing Sheets

Section view
Umbrella check valve closed

METHODS AND APPARATUS FOR BEVERAGE DISPENSING

CROSS-REFERENCE TO RELATED APPLICATION AND PRIORITY INFORMATION

This application claims the benefit of and priority from prior filed U.S. provisional application No. 63/412,989, entitled "Methods and Apparatus for Beverage Dispensing", filed Oct. 4, 2022, which is incorporated herein by reference in its entirety.

TECHNICAL FIELD OF THE INVENTION

This invention relates generally to beverage dispensing, and in particular to nozzles and associated methods.

BACKGROUND OF THE INVENTION

In post-mix beverage dispensing, a diluent, such as, without limitation, plain or carbonated water, is mixed with one or more base fluids to form a drink. Base fluids may be syrups, flavors, concentrates, or any other fluids. The diluent and base fluid(s) are dispensed through a nozzle, and mix in or outside the nozzle.

In some instances, only the diluent is to be dispensed, for example when a customer desires only water. If residual base fluids are present in the nozzle (for example, from previous dispenses), they may be inadvertently mixed with the diluent, resulting in the presence of undesirable ingredients in the drink, including, without limitation, sweeteners or flavorings. These problems often present as color and taste issues.

Also, when dispensing drinks that may foam, such as carbonated drinks, it is desirable to limit foaming, because excess foaming may result in drinks that are less than full when presented to a customer, or in greater dispensing time (because of the need to wait for the foaming to subside and top-off the drink).

SUMMARY OF THE INVENTION

In accordance with the teachings of the present invention a nozzle and associated method are provided.

In one embodiment, a nozzle is provided which comprises a diluent inlet coupled to a diluent supply, a diluent outlet in fluid communication with the diluent inlet, the diluent flowing out of the diluent outlet in a diluent flow path when diluent is demanded, a base fluid inlet coupled to a base fluid supply, a base fluid outlet in fluid communication with the base fluid inlet, a check valve proximate the base fluid outlet and operable to open when base fluid is demanded and to close the base fluid outlet if base fluid is not demanded, and a plurality of flow directors through which base fluid flows when the check valve is open, the flow directors directing the base fluid to merge into the diluent flow path at an angle that is less than 90 degrees.

In a particular embodiment, each of the flow directors creates a respective stream of base fluid when the check valve is open.

In a particular embodiment, the check valve comprises an umbrella valve.

In a particular embodiment, a recessed seat is provided on which the base fluid outlet is located and against which the check valve closes. In an embodiment, the recessed seat is defined by a recessed wall, and the flow directors are located along the recessed wall.

In a particular embodiment, the nozzle further comprises a static mixer downstream of the base fluid outlet.

In a particular embodiment, the nozzle further comprises a plurality of protrusions extending downward, each of the protrusions located between respective flow directors Also provided is a method of mixing a diluent and a base fluid which comprises receiving the diluent, directing the diluent into an outlet diluent flow path, receiving the base fluid, directing the base fluid to a base fluid outlet, closing the base fluid outlet when base fluid is not demanded, opening the base fluid outlet when base fluid is demanded, and when base fluid is demanded, directing the base fluid to merge into the outlet diluent flow path at an angle that is less than 90 degrees through a plurality of flow directors.

In a particular embodiment of the method, each of the flow directors creates a respective stream of base fluid when the check valve is open.

In a particular embodiment, closing and opening the base fluid outlet is performed with an umbrella valve.

In a particular embodiment, the method further comprises statically mixing the diluent and base fluid downstream of the base fluid outlet.

In a particular embodiment, the method further comprises blocking flow of base fluid between each of the flow directors.

Important technical advantages are provided by the present invention. In particular, and without limitation, by providing flow directors in combination with a check valve, inadvertent dispensing of base fluids is reduced, and foaming is reduced.

BRIEF DESCRIPTION OF THE DRAWINGS

Reference is made in the description to the following briefly described drawings, which are not drawn to scale, and in which like reference numerals indicate like features.

DETAILED DESCRIPTION OF THE INVENTION

Although this invention is particularly suited for beverage dispensing, and will be discussed in connection with beverage dispensing embodiments, it may be implemented on any fluid dispenser in which one fluid and more than one fluid may be dispensed.

Figure 1:
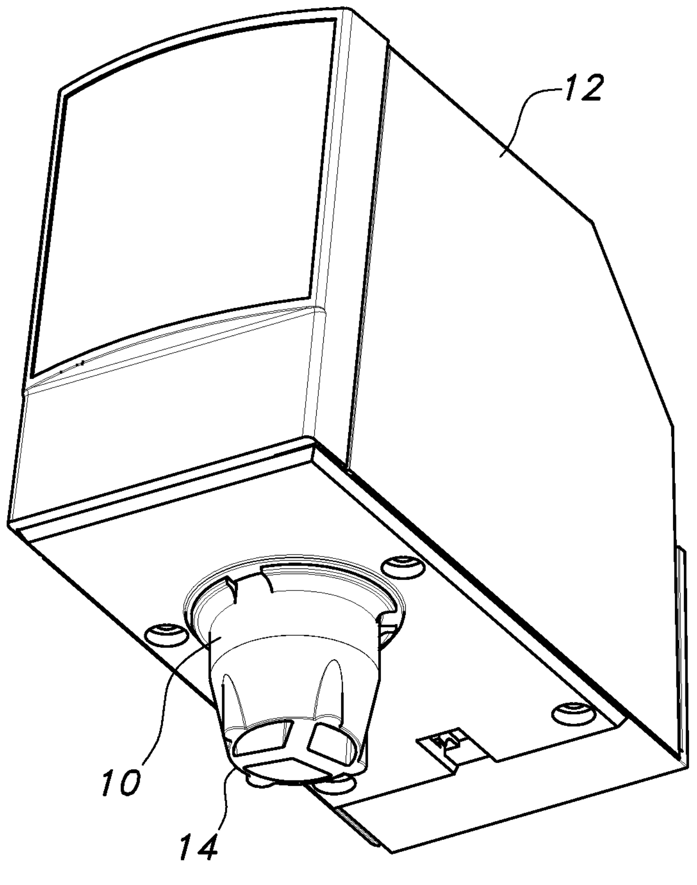
FIG. 1 is a bottom perspective view of one embodiment of a nozzle and valve housing according to the teachings of the present invention.

FIG. 1 is a bottom perspective view of one embodiment of a nozzle 10 and valve housing 12 according to the teachings of the present invention. Nozzle 10 includes an outer nozzle body 14 to be discussed in more detail below.

Valve housing 12 houses one or more valves (not shown) which control the flow of various fluids. In post-mix beverage dispensing, the fluids comprise a diluent, such as, without limitation, plain or carbonated water, and base fluids, such as, without limitation, syrups, flavors, or concentrates, and any combination thereof. In response to a request for a beverage, the valves operate to allow the flow of diluent and one or more base fluids through nozzle 10 into a cup. In some instances, only the diluent is to be dispensed, for example in response to a request for water only. Nozzle 10 couples to fluid outlets of the valves in any suitable way.

Figure 2:
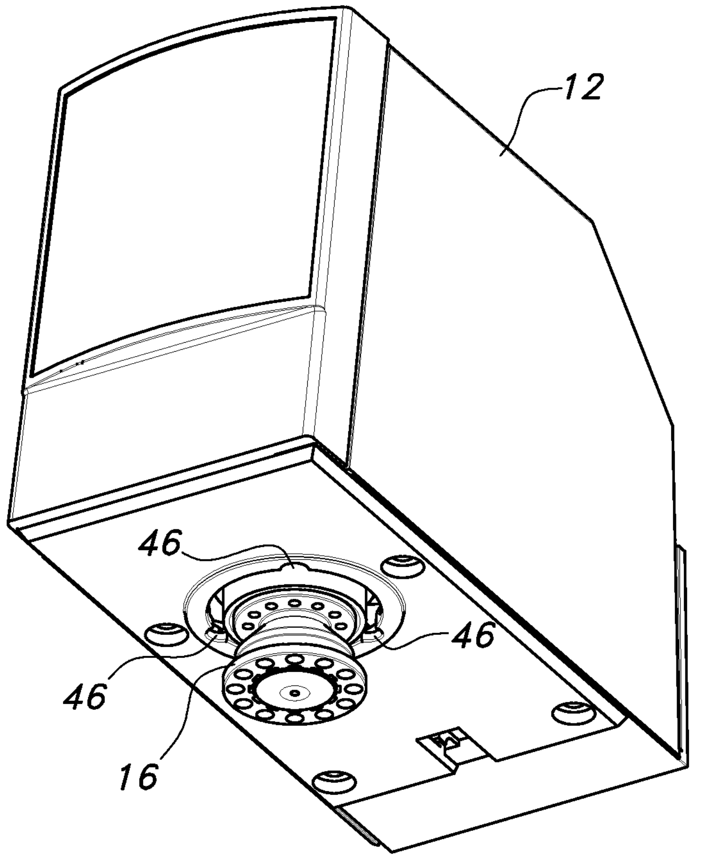
FIG. 2 is a bottom perspective view of the embodiment of FIG. 1 with the outer nozzle body removed.

FIG. 2 is a bottom perspective view of the embodiment of FIG. 1 with the outer nozzle body 14 removed, and illustrates one embodiment of a nozzle diffuser 16, in its position in which it is coupled to valves of valve housing 12.

Figure 3A:
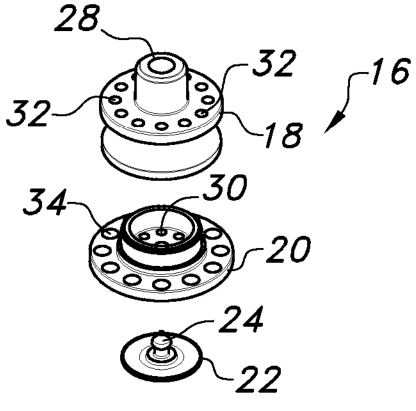
FIGS. 3A-3C are top perspective views of one embodiment of nozzle components according to the teachings of the present invention.
Figure 3B:
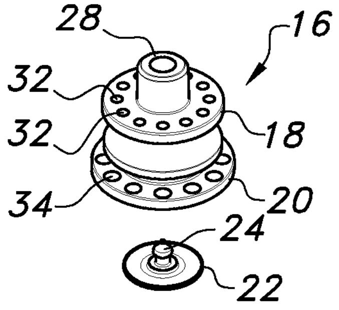
Figure 3C:
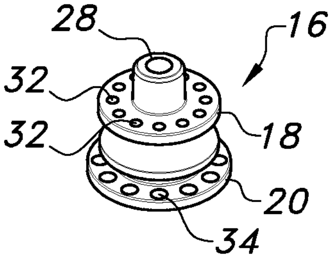
Figure 4A:
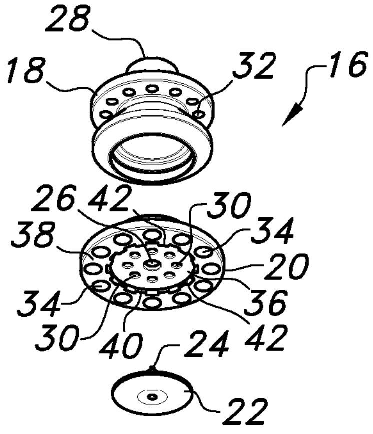
FIGS. 4A-4C are corresponding bottom perspective views of the embodiment of FIGS. 3A-3C.
Figure 4B:
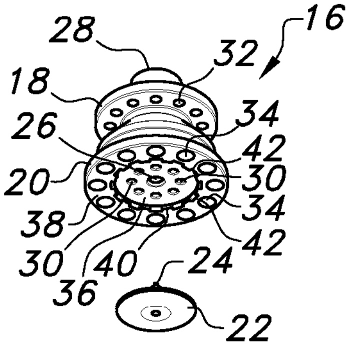
Figure 4C:
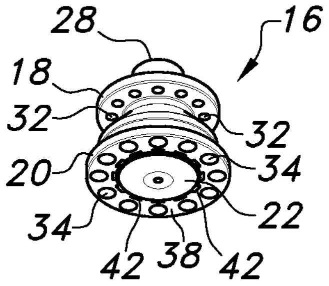
Figure 5:
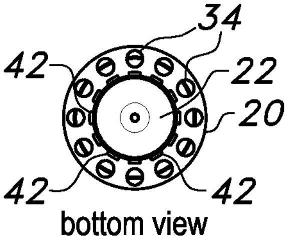
FIG. 5 is a bottom view of the embodiment of FIGS. 3A-4C.

Nozzle diffuser 16 is described in connection with FIGS. 3-6. FIGS. 3A-3C provide top perspective views, with FIG. 3A showing an exploded view, 3B a partially exploded view, and 3C an assembled view. FIGS. 4A-4C provide corresponding bottom perspective views. FIG. 5 is a bottom view.

Diffuser 16 includes an upper diffuser body 18, a lower diffuser body 20, and a check valve 22. Upper and lower diffuser bodies 18 and 20 may be joined in any suitable way, including, without limitation, by sonic welding, press-fit, or screwing. Also, upper and lower diffuser bodies 18 and 20 may be formed as one unit. Check valve 22 is preferably an umbrella valve, which may be pressed in place, for example by pressing its securing post 24 into receiving receptacle 26 (best seen in FIGS. 3A, 3B, 4A, and 4B). For typical beverage dispensing applications, the umbrella check valve may be made of any suitable material, including, without limitation, silicone or other rubber materials, and open at a pressure of about 1 PSI. However, any suitable check valve may be used.

Upper diffuser body 18 includes a base fluid inlet 28 for receiving base fluid. Lower diffuser body 20 includes one or more base fluid outlets 30 (best seen in FIGS. 4A and 4B) in fluid communication with base fluid inlet 28. In the particular embodiment shown, base fluid outlets 30 are arranged in a ring; however, other arrangements, and more or fewer outlets, may be used.

Upper diffuser body 18 also includes diluent ports 32 through which a diluent flows. In the particular embodiment shown, diluent ports 32 are arranged in a ring; however, other arrangements, and more or fewer ports, may be used. Lower diffuser body 20 includes diluent outlets 34 in fluid communication with diluent ports 32. In the particular embodiment shown, diluent outlets 34 are arranged in a ring; however, other arrangements, and more or fewer outlets, may be used.

As best seen in FIGS. 4A and 4B, lower diffuser body 20 includes a recessed seat 36 against which check valve 22 seals. Base fluid outlets 30 emerge at recessed seat 36. Recessed seat 36 is recessed with respect to surface 38 (at which diluent outlets 34 emerge). As seen in FIGS. 4A-4C and 6, recessed seat 36 is recessed from surface 38 at a recess wall 40. Flow directors 42 are provided along recess wall 40 and provide angled openings along the recess wall 40. Flow directors 42 may be any suitable shape, such as, without limitation, wedge-shaped or scallop-shaped, and, as will be discussed below, create flow paths for base fluid flowing out of base fluid outlets 30.

FIG. 5 is a bottom view of diffuser 16.

Figure 6:
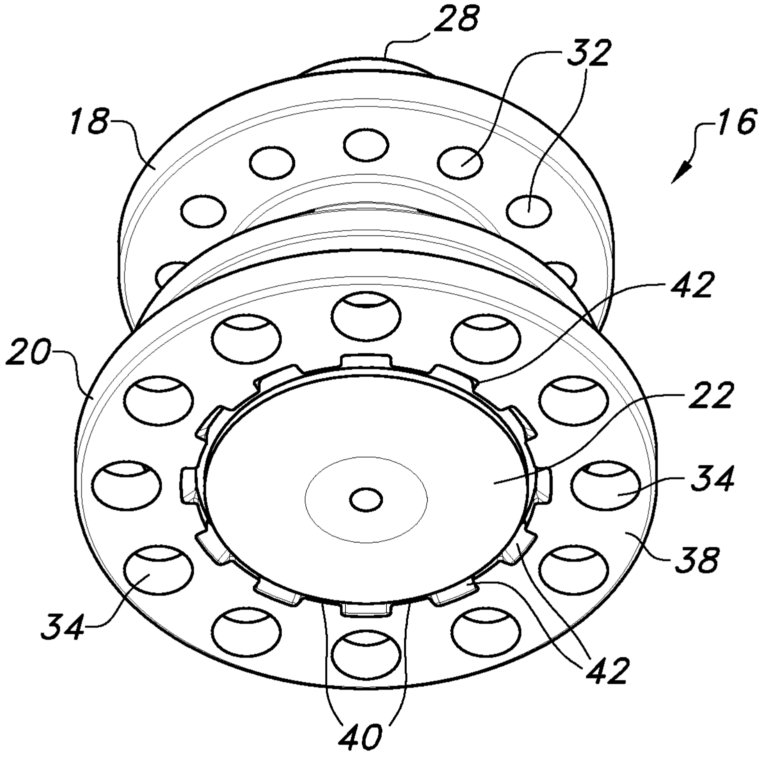
FIG. 6 is an enlarged bottom perspective of the embodiment shown in FIG. 4*c;*

FIG. 6 is an enlarged bottom perspective of the diffuser 16 shown in FIG. 4C.

Figure 7A:
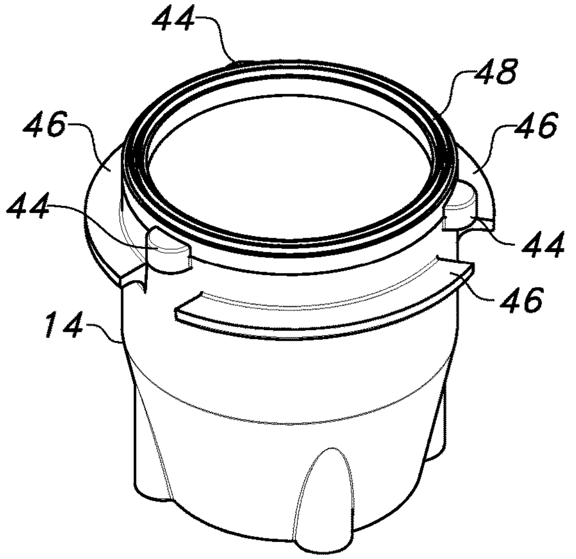
FIGS. 7A-7C present views of one embodiment of an outer nozzle body according to the teachings of the present invention.
Figure 7B:
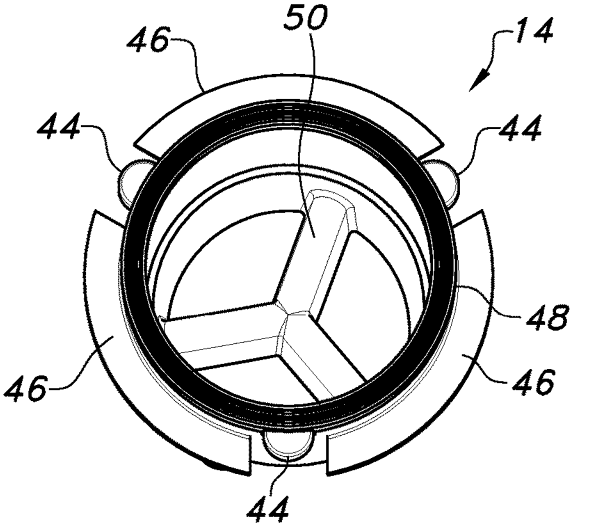
Figure 7C:
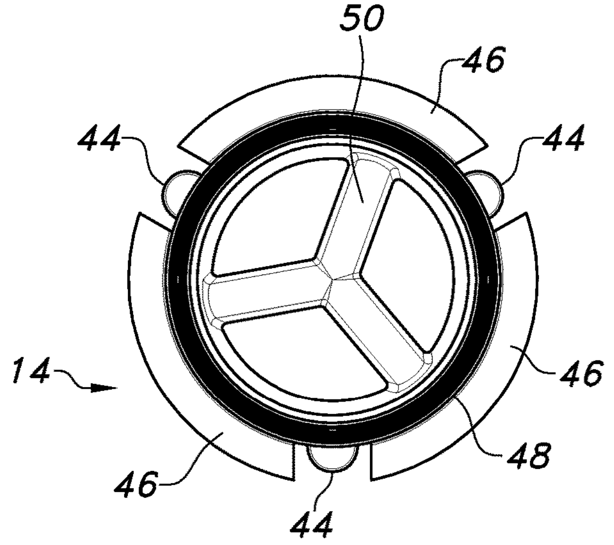

FIGS. 7A-7C present views of one embodiment of an outer nozzle body 14 according to the teachings of the present invention. FIGS. 7A and 7B are perspective top views at different angles, and FIG. 7C is a top view. Outer nozzle body 14 includes tabs 44, shoulders 46, and sealing surface 48 for engagement with housing 12. To engage outer nozzle body 14 with housing 12, tabs 44 are passed through matching voids 46 (see FIG. 2), and as outer nozzle body 14 is then rotated, tabs 14 engage with ramps (not shown) to pull shoulders 46 and sealing surface 48 into engagement with housing 12. This particular approach for engaging outer nozzle body 14 with valve housing 12 is one example, and it may be engaged in any suitable way. Also, outer nozzle body 14 includes a static mixer 50, which serves to enhance mixing of the diluent and base fluid and to retain check valve 22 if it is inadvertently dislodged. Static Mixer is shown as a three-legged cross bar, but other structures may be used (for example, and without limitation, a lattice structure).

Figure 8:
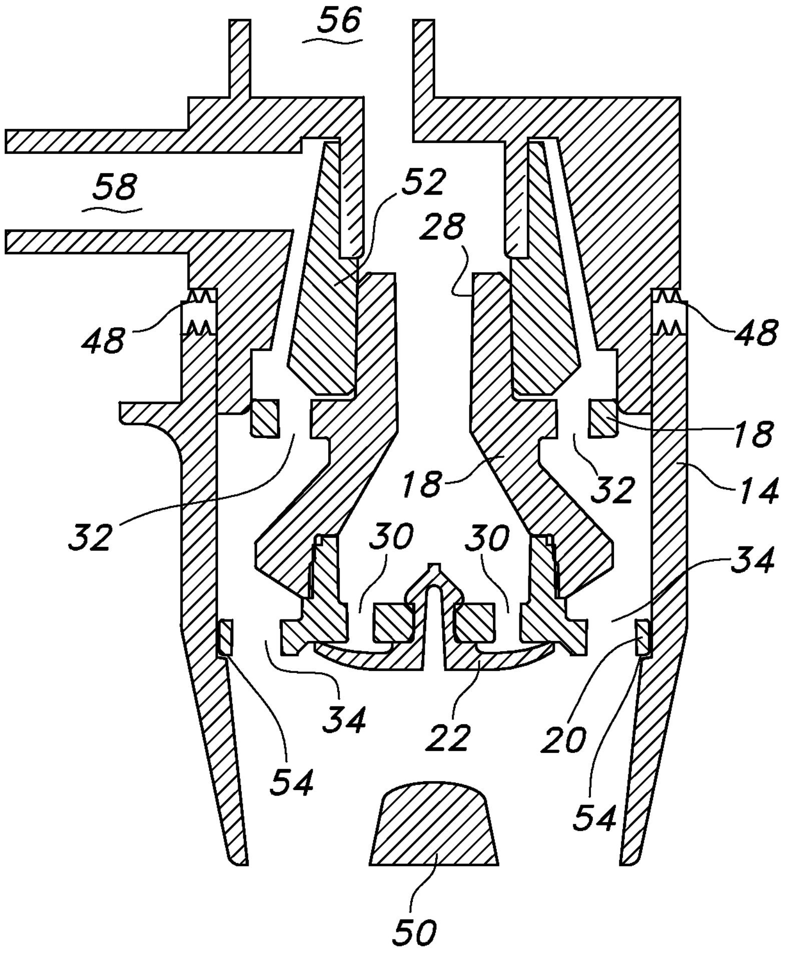
FIG. 8 is a sectional view of one embodiment of a nozzle with a closed check valve according to the teachings of the present invention.

FIG. 8 is a sectional view of one embodiment of a nozzle 10 with a closed check valve 22 according to the teachings of the present invention. Base fluid inlet 28 of upper diffuser body 18 couples with member 52 of a valve assembly, for example with a friction fit or any suitable engagement approach, and is in fluid communication with a supply 56 of base fluid. Outer nozzle body 14 secures diffuser 16 in place by engagement of annular shoulder 54 with lower diffuser body 20. Diluent ports 32 are in fluid communication with diluent supply 58.

Figure 9:
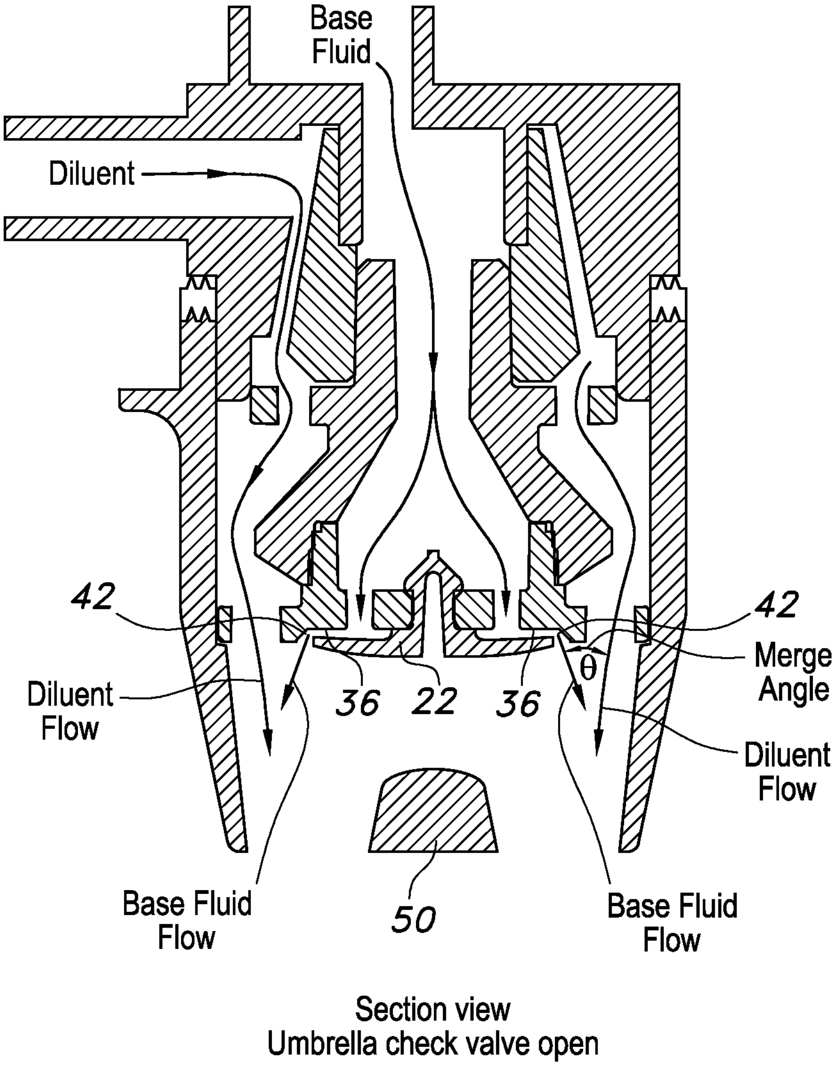
FIG. 9 is a sectional view of one embodiment of a nozzle with an open check valve (with flow arrows) according to the teachings of the present invention.

FIG. 9 is the same sectional view as FIG. 8, except that check valve 22 is open, and FIG. 9 includes fluid flow arrows. Check valve 22 opens when the base fluid is demanded, and lifts from recessed seat 36, allowing base fluid to flow. Flow directors 42 direct the flow at any desired exit angle. The exit angle may be any suitable angle or angles. One range of angles found to be effective is (and including) 30 to 60 degrees from horizontal for diluent flow streams such as shown in FIG. 9. The exit angle is determined by the shape and angle of the flow directors 42.

Figure 10:
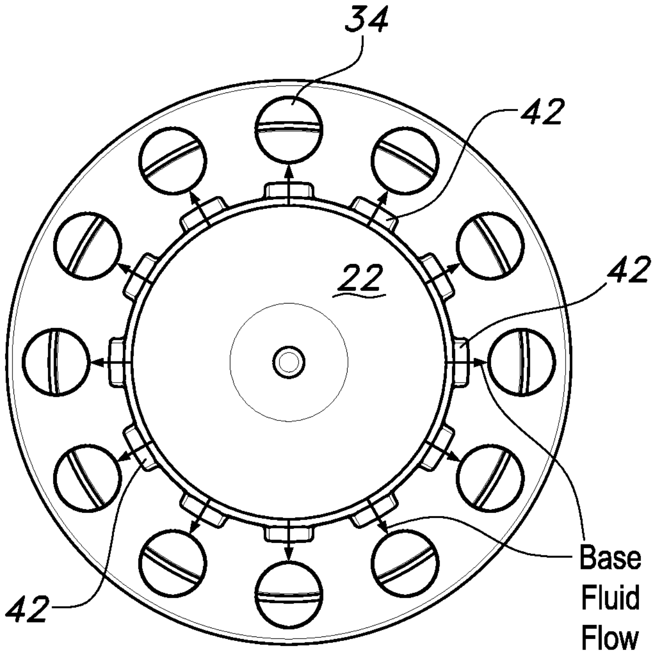
FIG. 10 is an enlarged view of the embodiment of FIG. 5 with flow arrows.

FIG. 10 is an enlarged view of the embodiment of FIG. 5 with the check valve 22 open, and with flow arrows.

As seen in FIGS. 9 and 10, the base fluid flowing from the flow directors 42 intersects and mixes with the diluent flow below the lower diffuser body 20. Flow directors 42 direct the base fluid flow so that it merges with the diluent flow stream at an angle that reduces agitation. The angle at which the streams merge is a function of the diluent flow direction (which may flow straight down or at a slanted angle) and the base fluid flow direction (directed by the flow directors 42). Agitation is highest if the base fluid flow direction and the diluent flow direction are opposed (that is, if they have vertical flow components that are in opposition), and relatively high if they merge perpendicularly. With the present invention, the flow directors 42 direct the base fluid to merge with the diluent flow at an angle that is not opposed and not perpendicular (i.e., at an angle that is less than 90 degrees (see FIG. 9)—as used herein, an opposed merging angle is one that is more than 90 degrees). This results in less agitation of at the point of intersection, and therefore, for diluents such as carbonated water, less foaming. Less foaming is desirable because it allows for faster dispensing. Also, use of a plurality of flow directors 42 creates a plurality of respective streams of base fluid flow, rather than a solid disc of flow (see, for example, the flow arrows of FIG. 10). Each of these streams has a relatively large cross-sectional area, thereby resulting in relatively lower base fluid velocity which in turn results in less agitation at the point of fluid intersection with the diluent.

The flow directors 42 are preferably spaced apart in an annular arrangement along the full circumference of the recess wall 40, but may be located as appropriate for the application, for example, and without limitation, on less than the full circumference. Furthermore, the flow directors 42 may have any suitable shape, and other features may be included to direct the base fluid streams as desired. For example, without limitation, another embodiment is shown in FIGS. 11A-F, in which protrusions 60 extend downward from surface 38 of diffuser 16.

Figure 11A:
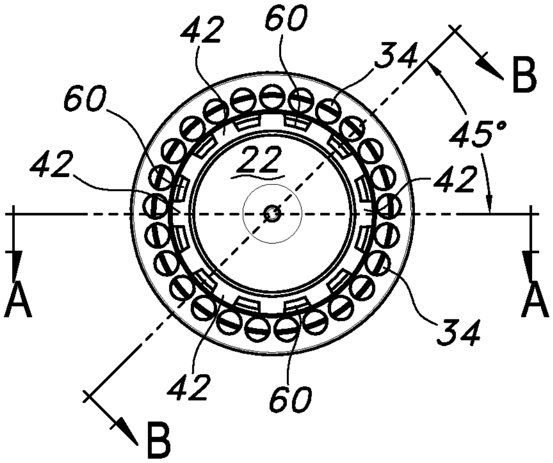
FIGS. 11A-F present views of another embodiment of a nozzle according to the teachings of the present invention.
Figure 11B:
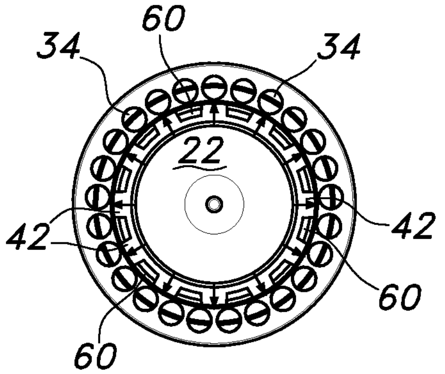
Figure 11C:
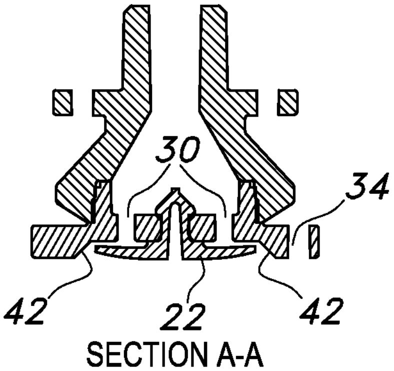
Figure 11D:
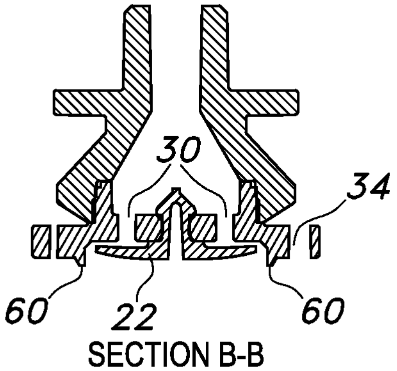
Figure 11E:
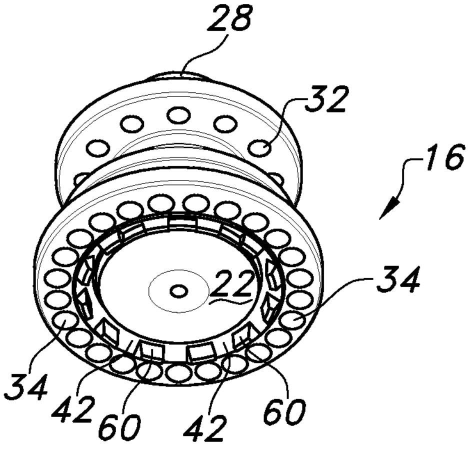
Figure 11F:
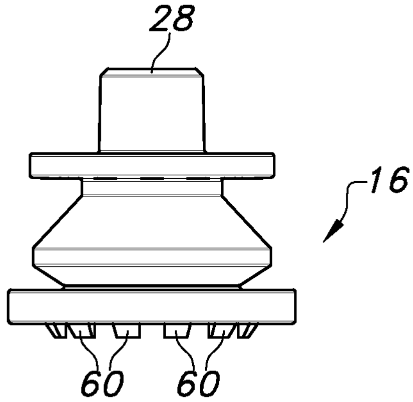

FIGS. 11A and 11B present a bottom view of this embodiment, with FIG. 11B showing base fluid flow arrows. FIGS. 11C and 11D are sectional views taken on the sections indicated in FIG. 11A. FIG. 11E is a bottom perspective view of this embodiment, and FIG. 11F is a side view of this embodiment. In this embodiment, flow directors 42 are located between the protrusions 60 and function as described above, with protrusions 60 acting to further block base fluid flow between the flow directors 42.

In any of the embodiments, when the base fluid is not demanded, check valve 22 closes and seals off base fluid outlets 30, thereby stopping base fluid from dripping and covering the outlets 30. Because of this sealing, when only diluent is demanded (for example, a customer desires plain or carbonated water only), ingredient carryover from base fluid dripping or from diluent contact with the base fluid outlets 30 is eliminated or greatly reduced.

Although the nozzle has been discussed in connection with a single base fluid inlet, it may be implemented in a multi-flavor nozzle. With a multi-flavor embodiment, multiple base fluid inlets are provided, each with its own outlet, with the above-described check valve and flow directors provided on one or more of such outlets.

As used herein, coupled includes direct connection or indirect connection through one or more intermediate members.

Particular features of the example embodiments may be used with, added to, or substituted in the other example embodiments.

Although the present invention has been described in detail, it should be understood that various changes, alterations, substitutions, additions, and modifications could be made without departing from the intended scope of the invention, as defined in the following claims.

What is claimed is:

1. A nozzle, comprising:

a diluent inlet coupled to a diluent supply;

a diluent outlet in fluid communication with the diluent inlet, the diluent flowing out of the diluent outlet in a diluent flow path when diluent is demanded;

a base fluid inlet coupled to a base fluid supply;

a base fluid outlet in fluid communication with the base fluid inlet;

a check valve proximate the base fluid outlet and operable to open when base fluid is demanded and to close the base fluid outlet if base fluid is not demanded; and a plurality of flow directors through which base fluid flows when the check valve is open, the flow directors directing the base fluid to merge into the diluent flow path at a point of intersection having an angle that is greater than or equal to 30 degrees and less than 90 degrees.

2. The nozzle of claim 1, wherein each of the flow directors creates a respective stream of base fluid when the check valve is open.

3. The nozzle of claim 1, wherein the check valve comprises an umbrella valve.

4. The nozzle of claim 1, and further comprising a recessed seat on which the base fluid outlet is located and against which the check valve closes.

5. The nozzle of claim 4, wherein the recessed seat is defined by a recessed wall, and the flow directors are located along the recessed wall.

6. The nozzle of claim 1, and further comprising a static mixer downstream of the base fluid outlet.

7. The nozzle of claim 1, and further comprising a plurality of protrusions extending downward, each of the protrusions located between respective flow directors.

8. A method of mixing a diluent and a base fluid, comprising:

receiving the diluent;

directing the diluent into an outlet diluent flow path;

receiving the base fluid;

directing the base fluid to a base fluid outlet;

closing the base fluid outlet when base fluid is not demanded;

opening the base fluid outlet when base fluid is demanded; and when base fluid is demanded, directing the base fluid to merge into the outlet diluent flow path at a point of intersection having an angle that is greater than or equal to 30 degrees and less than 90 degrees through a plurality of flow directors.

9. The method of claim 8, wherein each of the flow directors creates a respective stream of base fluid when the check valve is open.

10. The method of claim 8, wherein closing and opening the base fluid outlet is performed with an umbrella valve.

11. The method of claim 8, and further comprising statically mixing the diluent and base fluid downstream of the base fluid outlet.

12. The method of claim 8, and further comprising blocking flow of base fluid between each of the flow directors.

13. A nozzle, comprising:

a diluent inlet coupled to a diluent supply;

a diluent outlet in fluid communication with the diluent inlet, the diluent flowing out of the diluent outlet in a diluent flow path when diluent is demanded;

a diffuser including a base fluid inlet coupled to a base fluid supply and a base fluid outlet in fluid communication with the base fluid inlet;

a check valve proximate the base fluid outlet and operable to open when base fluid is demanded and to close the base fluid outlet if base fluid is not demanded; and the diffuser defining a plurality of flow directors through which base fluid flows when the check valve is open, the flow directors directing the base fluid to merge into the diluent flow path at an angle that is less than 90 degrees.

14. The nozzle of claim 13, wherein each of the flow directors creates a respective stream of base fluid when the check valve is open.

15. The nozzle of claim 13, wherein the check valve comprises an umbrella valve.

16. The nozzle of claim 13, wherein the diffuser includes a recessed seat on which the base fluid outlet is located and against which the check valve closes.

17. The nozzle of claim 16, wherein the recessed seat is defined by a recessed wall, and the flow directors are located along the recessed wall.

18. The nozzle of claim 13, and further comprising a static mixer downstream of the base fluid outlet.

19. The nozzle of claim 13, and further comprising a plurality of protrusions extending downward, each of the protrusions located between respective flow directors.

* * * * *